United States Patent Office 2,908,993
Patented Oct. 20, 1959

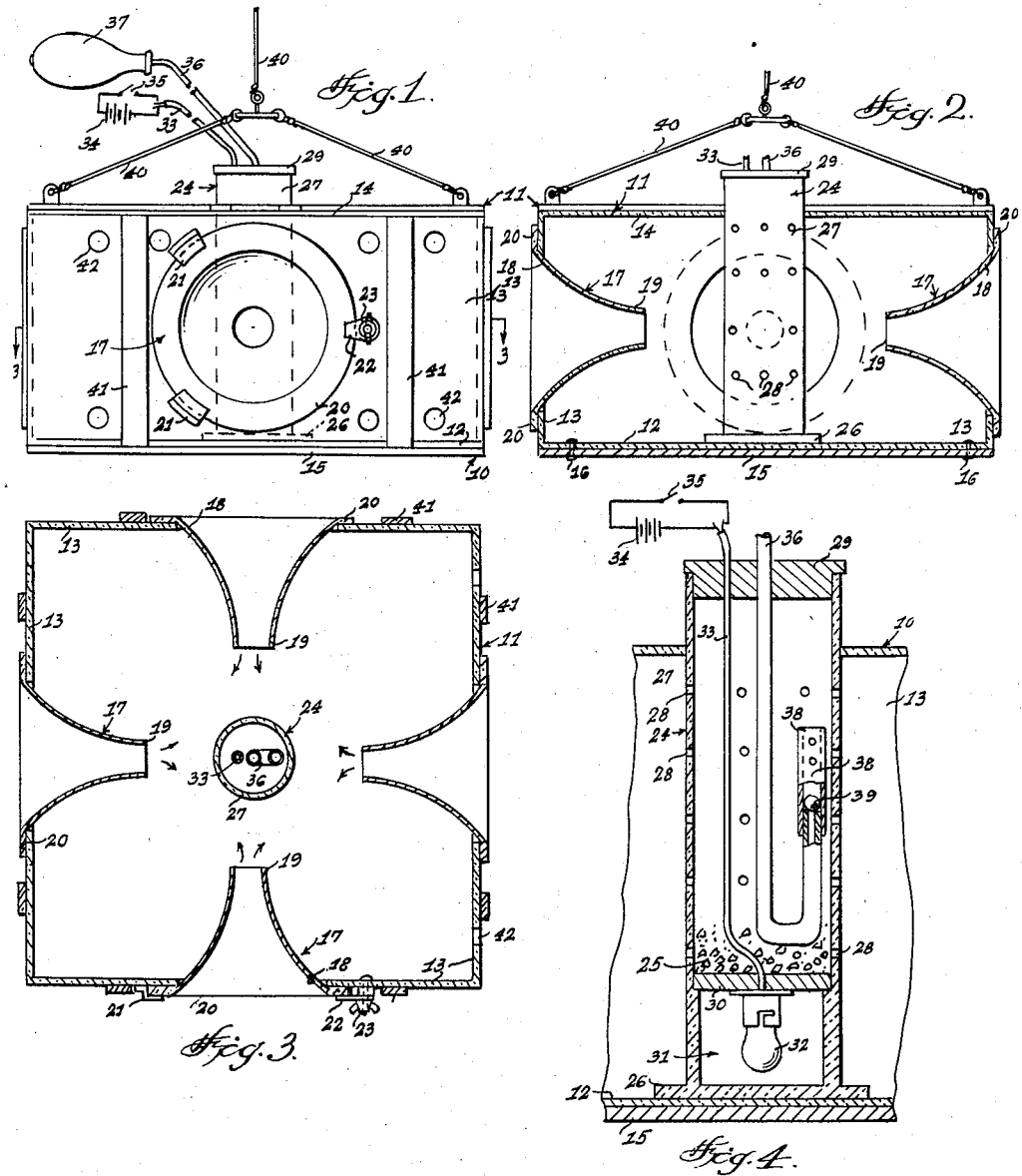

2,908,993
SURE CATCH MINNOW AND SHRIMP TRAP

James Webb and Iva B. Smith, Dayton, Ohio

Application August 21, 1958, Serial No. 756,437

1 Claim. (Cl. 43—102)

This invention relates to a trap, and more particularly to a trap for use in catching fish, minnows, shrimp or the like.

The object of the invention is to provide a trap which is adapted to be positioned in a body of water whereby fish, minnows, shrimp or other similar species will be attracted to the trap and when the fish or minnows enter the trap they will be retained in the trap so that they can be later removed and used for any desired purpose.

Another object of the invention is to provide a trap which is adapted to be made of transparent material such as a transparent plastic, and wherein the trap includes a tube that is adapted to hold bait therein, there being a light bulb mounted in the tube which helps attract the fish or minnows or other objects to be caught or trapped, and wherein there is further provided a means for forcing air under pressure into the bait holding tube so that fish within the trap can be fed or supplied with bait to further increase the effectiveness of the trap.

A further object of the invention is to provide a trap which is extremely simple and inexpensive to manufacture.

Other objects and advantages will be apparent during the course of the following description.

In the accompanying drawings, forming a part of this application, and in which like numerals are used to designate like parts throughout the same:

Figure 1 is an elevational view of the trap of the present invention.

Figure 2 is a vertical sectional view illustrating the trap.

Figure 3 is a sectional view taken on the line 3—3 of Figure 1.

Figure 4 is an enlarged vertical sectional view taken through the bait holding tube and showing certain constructional details thereof.

Referring in detail to the drawings, the numeral 10 indicates the trap of the present invention which is shown to comprise a hollow housing 11 that is adapted to be made of a suitable transparent material such as a transparent plastic. The housing 11 includes a horizontally disposed bottom wall 12, as well as a plurality of vertically disposed spaced apart wall members 13, and the housing 11 further includes a horizontally disposed top wall 14.

The numeral 15 indicates a weighted plate member which is secured below the bottom wall 12 in any suitable manner, as for example by means of securing elements 16.

There is further provided a plurality of funnel shaped body members 17 which are connected to and extending through the wall members 13, and each of the funnel shaped body members 17 has its outer portion 18 of greater diameter than the inner portion 19. This construction serves to insure that fish, minnows, shrimp or the like can readily pass inwardly through the body members 17, but the restricted portions 19 will help prevent the fish or minnows or other members from passing back out of the trap after they have once entered the same. Each of the body members 17 is provided with a circular flange as indicated by the numeral 20.

At least one of the body members 17 is detachably connected to its corresponding wall member 13 so that this particular body member can be removed, as for example when the trap is to be cleaned or repaired, or when the fish, minnows, or shrimp are to be removed from the trap. For detachably connecting this body member to its corresponding wall member 13, there is provided a pair of spaced apart lugs 21 which are secured to or formed integral with a wall member 13, and the lugs 21 engage the flange 20 of the body member 17. There is further provided a pivotally mounted catch 22 which is mounted for movement into and out of engagement with a portion of the flange 20, and the catch 22 is held in place by a securing element or pin 23. Thus, by loosening the securing element 23, the catch 22 can be pivoted from the position shown in Figure 1 whereby the body member 17 can be removed from the wall member 13 for the previously described purpose.

There is further provided a bait holding tube which is indicated generally by the numeral 24, and the tube 24 is mounted in the housing 11 and the tube 24 is adapted to be made of a suitable transparent plastic material. The tube 24 includes a horizontally disposed base 26 which is arranged contiguous to the upper surface of the bottom wall 12, and the tube 24 is adapted to hold bait 25 which may be cornmeal or the like. Furthermore, brightly colored steel wool or other similar material may be arranged in the tube 24 so as to help increase the attractiveness thereof in order to more readily attract fish or the like to the interior of the trap. The tube 24 includes a cylindrical wall portion 27 which extends through the top wall 14 of the housing 11, Figure 4, and the wall 27 is provided with a plurality of spaced apart apertures 28 therein whereby some of the bait such as the cornmeal can pass out through the apertures 28 so as to feed the fish within the trap, and wherein the bait passing outwardly through the apertures 28 will provide a further means of attracting the fish to the interior of the trap.

The numeral 29 indicates a plug which is mounted in the upper end of the tube 24, and a horizontally disposed partition 30 is arranged in the tube 24 below the plug 29, the partition 30 defining in the lower portion of the tube a chamber or compartment 31. The numeral 32 indicates a light bulb which is mounted below the partition 30, and the light bulb 32 is adapted to be connected to a suitable source of electrical energy such as a battery 34 by means of wires 33, there being a switch 35 for controlling actuation of the bulb 32.

There is further provided an air supply conduit 36 which extends into the tube 24, and a manually compressible bulb 37 is connected to an end of the tube 36, there being a check valve 38 connected to the other end of the conduit 36. The check valve 38 includes a ball 39. Thus, by manually squeezing or applying pressure to the bulb 37, air can be forced down through tube 36 so that this air will enter the tube 24 as the air passes out through the valve 38, and this air is used for forcing some of the bait 25 out through the apertures 28, and the air can also be used for aerating the water within the housing. Furthermore, the air forced into the tube by the conduit 36 can be used to create a bubbling effect which will help to also attract fish or the like to the interior of the trap. The check valve 38 including the movable ball 39 helps prevent water from entering the tube 36, but the check valve 38 permits air to move outwardly from the tube 36.

The numeral 40 indicates lines or cables which are connected to the trap whereby the trap can be readily suspended from a boat, pier or other like member or structure.

Suitable braces such as the braces 41 can be used wherever desired or required. The wall members 13 are provided with a plurality of spaced apart openings 42 therein whereby water can readily circuit into and out of the housing.

From the foregoing, it is apparent that there has been provided a trap which is especially suitable for use in catching fish, minnows, shrimp or the like. In use, bait such as the bait 25 is adapted to be positioned in the tube 24, and then with the parts arranged as shown in the drawings, the trap is adapted to be lowered or positioned in a body of water. The cables or lines 40 can be used for suspending the trap 10 in a body of water alongside a boat, pier or the like, and the bulb 37 is adapted to be positioned in the boat or on the pier and also the switch 35 can be arranged in a suitable location out of the water. Then, by closing the switch 35, the electrical circuit to the bulb 32 will be completed so that the bulb 32 will be energized. The bulb 32 will thus help attract fish to the interior of the trap. Furthermore, the compressible member 37 can be manually actuated so that air will be forced down through the tube or conduit 36, and this air will pass up through the valve assembly 38 and into the tube 24 so that some of the bait will pass outwardly through the apertures 28 whereby the odor from the bait will help attract fish to the trap, or else the material 25 can be used to feed the fish which are caught in the trap. As the fish are attracted by the tube mechanism 24, it will be seen that the fish can readily pass inwardly through the enlarged portions 18 of any of the body members 17, and the restricted throats 19 will help insure that the fish will not be able to leave the trap after they enter the interior thereof.

The housing 11 as well as the tube 24 are adapted to be made of transparent material so that the light 32 can be readily observed by the fish to be caught or trapped, and furthermore brightly colored material such as brightly colored steel wool may be placed in the transparent tube 24 to further increase or enhance the attractiveness of the device. The weighted plate 15 on the bottom of the housing helps maintain the trap in its proper position and by loosening the bolt 23, the catch 22 can be pivoted so as to permit the previously described body member 17 to be removed as for example when the fish within the trap are to be taken out of the trap.

The plug 29 can be removed as for example when additional bait 25 is to be placed in the tube 24. The chamber 31 can be made water-tight so that the light bulb 32 will not be affected by water.

The parts can be made of any suitable material and in different shapes or sizes.

The trap of the present invention can be used for catching various types of members such as minnows, fish, shrimp or the like. The weighted plate 15 may be provided with a metal portion such as a portion made of lead so as to help anchor the trap in swift or rough water. By making the parts of clear plastic, the device will be invisible to minnows or fish so as to increase the effectiveness thereof. By forcing air into the bait cup or tube 24, the bait will be kept stirred up so that the fish will have a tendency to go in and investigate the bubbles. There are a plurality of the body members 17, so that the fish can enter the trap from either one of four sides or directions. The bait 25 may consist of yellow cornmeal or other types of bait such as shrimp, worms, bread or the like can be used. However, yellow cornmeal has been found to be especially suitable for catching minnows. The openings 42 will permit small unwanted minnows to escape therethrough. Different sizes of body members 17 can be used so that different sizes or types of fish can be caught or trapped. The device is constructed so that it will readily sink in the water and the weighted bottom will keep the trap from moving around and bumping up against objects and wearing out. The trap may be set close to the shore or it can be arranged in weeds, seaways or the like and the trap can be used in fresh water or salt water, and in certain instances the light may be not necessary, and at certain times the bubbles may be omitted. When fishing at night, the light 32 helps attract the minnows or fish. The check valve 38 prevents water or bait from stopping up the conduit 36 but permits the air to pass therethrough. Brass wool saturated with bait may be used in the tube 24. The parts can be readily disassembled as for example when the device is to be cleaned or repaired or when any of the parts are to be replaced.

The present invention can also be used for catching crabs as well as fish, minnows, shrimp and the like.

Minor changes in shape, size and rearrangement of details coming within the field of invention claimed may be resorted to in actual practice, if desired.

We claim:

In a trap, a hollow transparent housing comprising a horizontally disposed bottom wall and a horizontally disposed top wall, a weighted plate member secured below said bottom wall, said housing further including vertically disposed spaced apart wall members provided with a plurality of openings therein, a funnel shaped body member connected to and extending through each of said wall members, each of said body members including an outer portion of increased diameter and an inner portion of reduced diameter, at least one of said body members being detachably connected to its respective wall member, a transparent bait holding tube including a horizontally disposed base contiguous to the bottom wall of said housing, said tube further including a cylindrical wall portion extending through the top wall of said housing, there being a plurality of spaced apart apertures in said wall portion, a plug mounted in the upper end of said tube, a horizontally disposed partition mounted in said tube adjacent the lower end thereof, a light positioned below said partition and connected to a source of electrical energy, an air supply conduit extending into said tube and having a valve assembly on one end thereof, a manually compressible bulb connected to the other end of said conduit, and lines connected to said housing.

References Cited in the file of this patent

UNITED STATES PATENTS

| | | |
|---|---|---|
| 822,543 | Murphy | June 5, 1906 |
| 869,556 | De Haas | Oct. 29, 1907 |
| 1,167,897 | Gooden | Jan. 11, 1916 |
| 1,773,324 | Sperling | Aug. 19, 1930 |
| 2,542,412 | Houser | Feb. 20, 1951 |
| 2,755,594 | Booth et al. | July 24, 1956 |